United States Patent
Rueping et al.

(10) Patent No.: US 8,321,756 B2
(45) Date of Patent: Nov. 27, 2012

(54) ERROR DETECTION CODE MEMORY MODULE

(75) Inventors: Stefan Rueping, Lengdorf (DE); Andreas Wenzel, Munich (DE)

(73) Assignee: Infineon Technologies AG, Neubiberg (DE)

(*) Notice: Subject to any disclaimer, the term of this patent is extended or adjusted under 35 U.S.C. 154(b) by 1195 days.

(21) Appl. No.: 12/143,264

(22) Filed: Jun. 20, 2008

(65) Prior Publication Data
US 2009/0319752 A1    Dec. 24, 2009

(51) Int. Cl.
*G11C 29/00* (2006.01)

(52) U.S. Cl. .......... 714/763; 714/799

(58) Field of Classification Search .......... 714/763, 714/799
See application file for complete search history.

(56) References Cited

U.S. PATENT DOCUMENTS

| | | | |
|---|---|---|---|
| 2003/0163769 A1* | 8/2003 | Phelps | 714/43 |
| 2007/0136505 A1 | 6/2007 | Wenzel et al. | |
| 2010/0115376 A1* | 5/2010 | Shalvi et al. | 714/763 |

* cited by examiner

*Primary Examiner* — Guy Lamarre
(74) *Attorney, Agent, or Firm* — Dickstein Shapiro LLP

(57) ABSTRACT

An error detection code (EDC) memory module coupled via a bus to a data memory module. In response to a request for data words from a specified memory address within the data memory module, the data memory module provides a predetermined number of data words and the EDC memory module provides a corresponding EDC word.

25 Claims, 3 Drawing Sheets

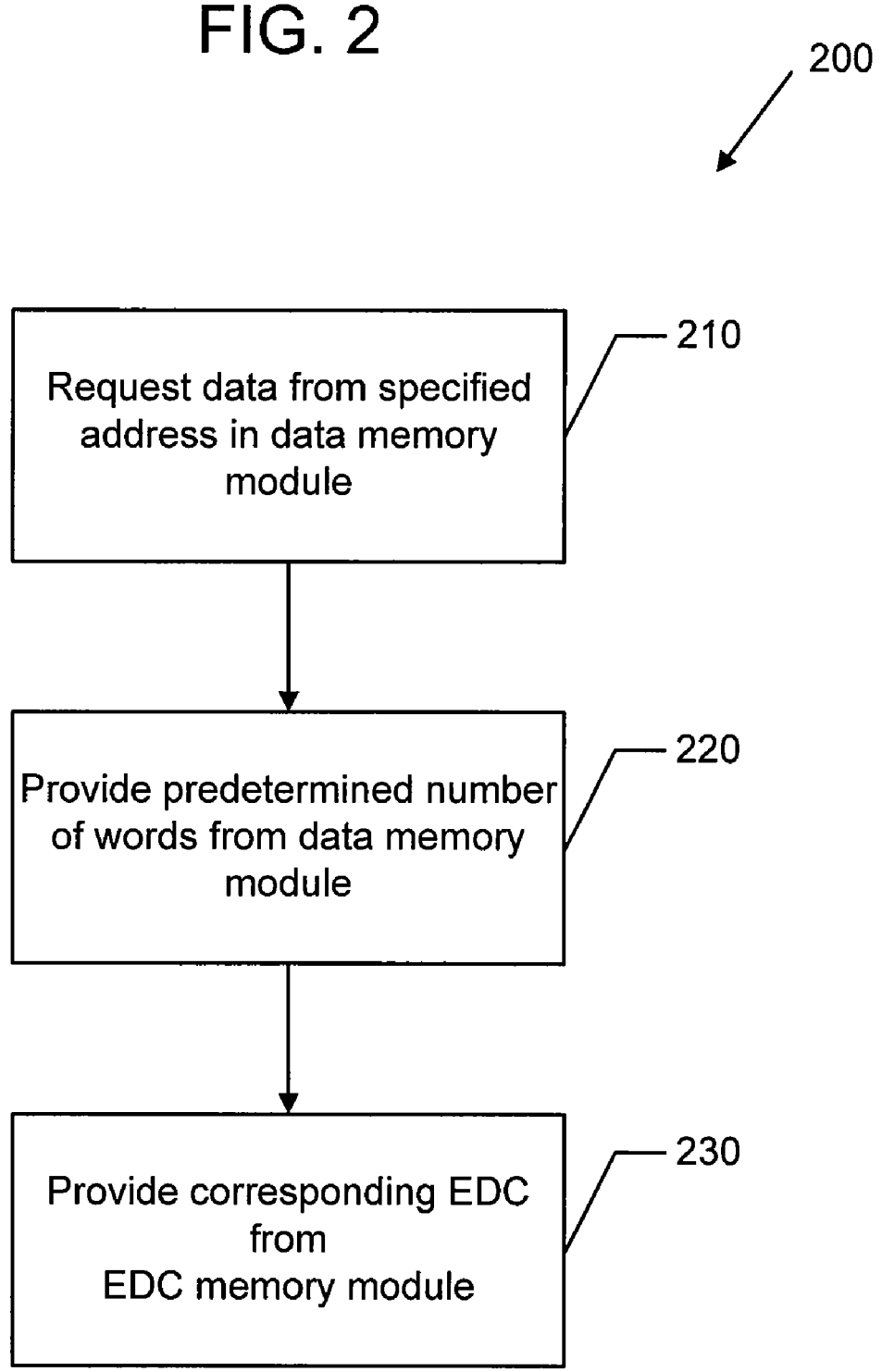

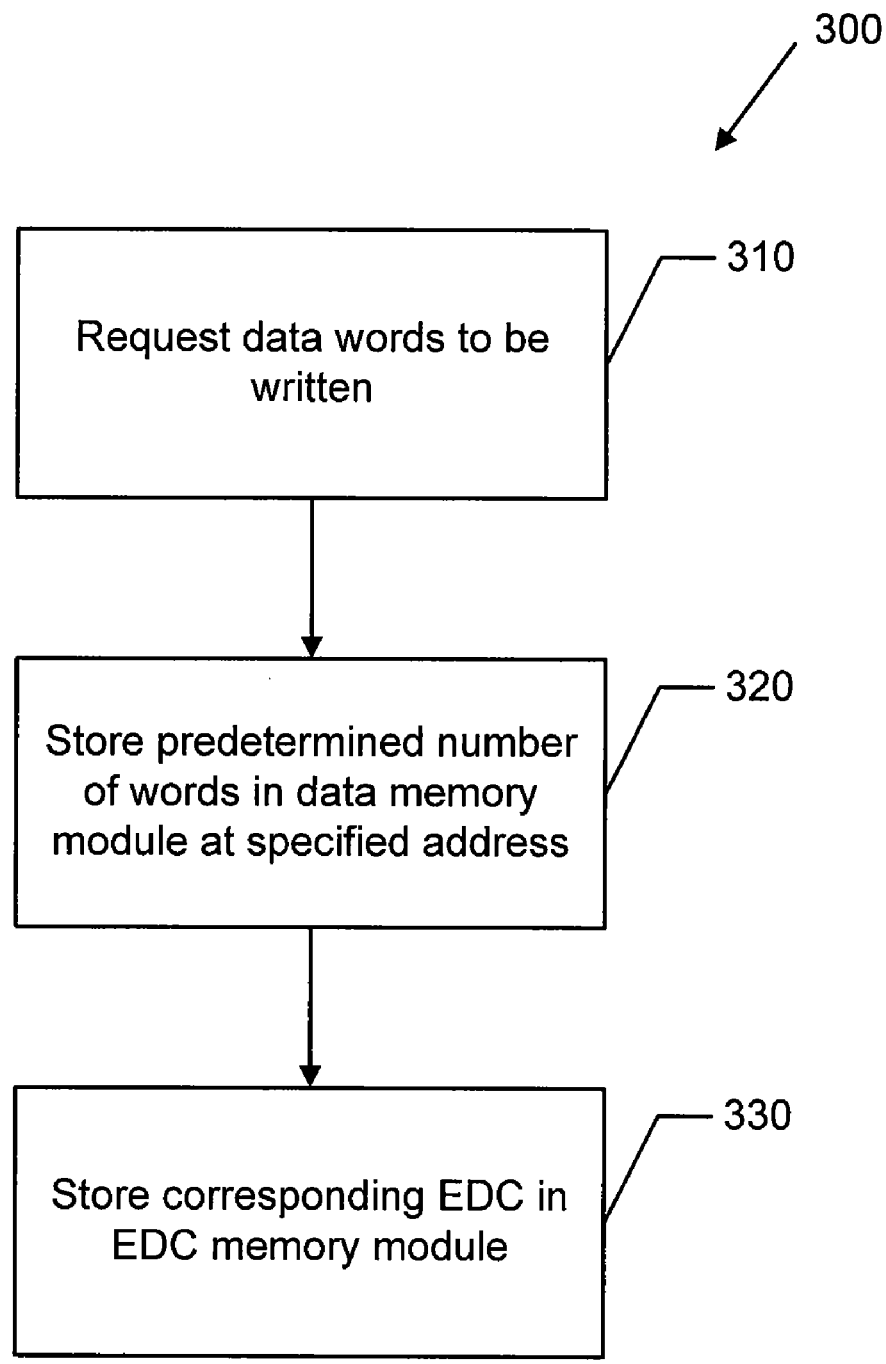

ERROR DETECTION CODE MEMORY MODULE

FIELD OF THE INVENTION

The present invention relates generally to memory modules, and more specifically to an error detection code memory module.

BACKGROUND OF THE INVENTION

A memory module of a device is used to store data to be processed or generated during device operation. One type of memory module, also known as memory, is random access memory (RAM). As its name implies, RAM can be accessed randomly, that is, it can be written to, or read from, any address location in any order. Additional kinds of memory include but are not limited to read-only memory (ROM), programmable ROM (PROM), and erasable programmable ROM (EPROM).

A memory module typically comprises memory locations. In each memory location, a data word comprising a number of bits or bytes can be stored. An address is allocated to each memory location and is used to access the respective memory location.

To detect errors in stored data words, a dedicated area in the memory module may be reserved for storing error detection code (EDC) words. The stored EDC words have a predetermined relationship with the stored data words. During a check of the EDC word with an associated data word, it is determined whether the predetermined relationship exists. If this is not the case, the existence of a manipulation or change in the stored data word can be concluded.

An EDC-protected memory module requires a certain amount of overhead in order to allow for its configuration. Hence, to store the same amount of data excluding EDC words, an EDC-protected memory module is always larger than a non-EDC-protected memory module.

Memory modules are manufactured with a fixed size and data word width. Memory modules must therefore be manufactured as different versions according to whether or not error detection using EDC words is desired.

BRIEF DESCRIPTION OF THE DRAWINGS

FIG. 2 illustrates a method of performing a read access operation in accordance with an embodiment of the present invention.

FIG. 3 illustrates a method of performing a write access operation in accordance with an embodiment of the present invention.

DETAILED DESCRIPTION OF PREFERRED EMBODIMENTS OF THE INVENTION

Figure 1:
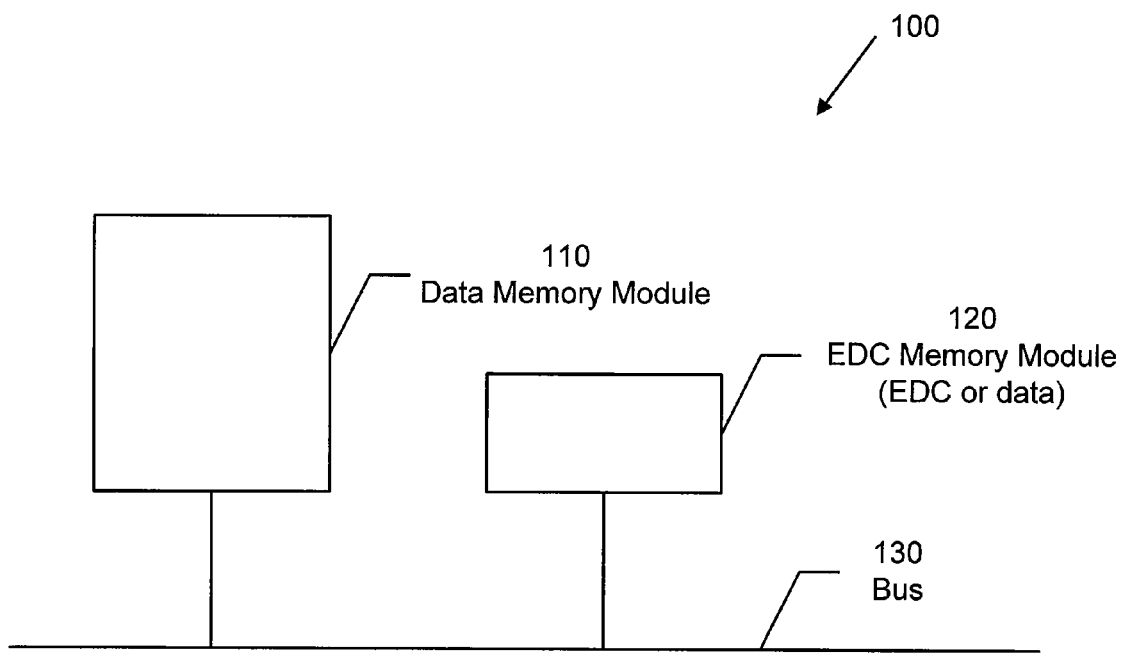
FIG. 1 illustrates a memory system having an error detection code memory module in accordance with an embodiment of the present invention.

By way of overview, the present invention is directed to an error detection code (EDC) memory module coupled to a data memory module via a bus. In response to a request for data words from a specified memory address within the data memory module, the data memory module provides a predetermined number of data words and the EDC memory module provides a corresponding EDC word. Since EDC words are stored in a dedicated EDC memory module, the data memory module may be a standard memory module that can also be used in non-EDC-protected memory systems.

FIG. 1 illustrates a memory system 100 having an error detection code (EDC) memory module 120 in accordance with an embodiment of the present invention. Memory system 100 includes data memory module 110, error detection code (EDC) memory module 120, and bus 130 coupling data memory module 110 and EDC memory module 120.

Data memory module 110 is a standard memory module, such as a random access memory (RAM), configured to store data words. The data words can be data and/or instructions in any format. In a preferred embodiment, data memory module 110 is configured to store 128-bit data segments consisting of four 32-bit words. However, data memory module 110 is not limited to any particular data segment or word size.

EDC memory module 120 is essentially an extension to data memory module 110 and is configured to store one 32-bit EDC word corresponding to each 128-bit data segment stored in data memory module 110. EDC memory module 120 is therefore roughly one quarter the size of data memory module 110. EDC memory module 120 responds to a same address as data memory module 110, and thus a processor or other device accessing memory system 100 considers data memory module 110 and EDC memory module to be a single module from a functional perspective. In a preferred embodiment each EDC word has a number of bits corresponding with that of each data word stored in data memory module 110, however, the invention is not necessarily limited in this respect.

In an alternative embodiment, EDC memory module 120 is reconfigurable between storing EDC words only, and storing both EDC words and data words. If EDC memory module 120 is configured to store both EDC words and data words, the EDC words correspond to data words in data memory module 110 and EDC memory module 120. In order to account for this variable configuration, EDC memory module 120 must store corresponding overhead.

Bus 130 couples data memory module 110 and EDC memory module 120. A bus master, such as a processor, and any other system components may be coupled to bus 130, however, these components are not shown for the sake of simplicity. As is known, the bus master or processor controls read and write accesses to data memory module 110 and EDC memory module 120.

Data memory module 110 is a standard memory module. It may be fitted in either a non-EDC-protected system or an EDC-protected system unchanged. Since data memory module 110 does not have a dedicated area for storing EDC words, no additional overhead is required, and thus data memory module 110 may be of a minimum size.

FIG. 2 illustrates a method of performing a read access operation in accordance with an embodiment of the present invention. A bus master transmits a read access request via bus 130 to data memory module 110 to read a data segment within data memory module 110 starting at a specified address (Step 210). In response to this read access request, data memory module 110 provides, via bus 130, a data segment consisting of a predetermined number of data words beginning at the specified address (Step 220). In a preferred embodiment, the data segment consists of four 32-bit data words, and data memory module 110 provides one of these four data words during each of four clock cycles. EDC memory module 120 responds to the same address as data memory module 110, but is configured, in the above example, to wait until after the four clock cycles of data word transmission before providing a 32-bit EDC word during a fifth clock cycle (Step 230). This EDC word corresponds to the data segment provided during the previous four clock cycles.

FIG. 3 illustrates a method of performing a write access operation in accordance with an embodiment of the present invention. A bus master transmits a write access request via bus 130 to data memory module 110 to store a data segment in data memory module 110 starting at a specified address (Step 310). Again, in a preferred embodiment, the data segment consists of four 32-bit data words, but the invention is not limited in this respect. Under control of the bus master, the data segment is transmitted via bus 130 and stored in data module 110 beginning at the specified address, wherein one of the four words of the data segment is stored in data memory module 110 during each of four cycles (Step 320). During a fifth cycle, an EDC word is stored in EDC memory module 120 (Step 330). This EDC word corresponds to the data segment provided during the previous four clock cycles.

The method of performing the read/write access operations are described as the storing steps occurring in a specific order. However, the invention is not limited to any particular order. Also, the invention is not limited to any particular size or number of words, size of segment, or number of clock cycles. For example, it is contemplated that more than one data word of a segment and/or corresponding EDC word could be provided/stored during a single clock cycle, or that data words of a segment and the corresponding EDC word could be provided/stored during non-consecutive clock cycles. Also for example, the data memory module could store 256-bit data segments consisting of eight 32-bit words.

The present invention is advantageous in that it allows a standard data memory module 110 having an optimum size to be manufactured for both non-EDC-protected and EDC-protected memory systems. EDC memory module 120 provides EDC-protected memory systems with the additional required data protection.

Although data memory module 110 and EDC memory module 120 have each been described as being a RAM, the invention is not limited in this respect. Each of data memory module 110 and EDC memory module 120 may be any type of memory module that is known and is suitable for the intended purpose.

The EDC word may be any type of error correction code known in the art. The invention is not intended to be limited in this respect.

While at least one exemplary embodiment has been presented in the foregoing detailed description, it should be appreciated that variations exist. It should also be appreciated that the exemplary embodiment or exemplary embodiments are only examples, and are not intended to limit the scope, applicability, or configuration of the invention in any way. One skilled in the art will appreciate that additional variations may be made in the above-described embodiment of the present invention without departing from the spirit and scope of the invention.

The invention claimed is:

1. An error detection code (EDC) memory module coupled via a bus to a data memory module, wherein in response to a request for data words from a specified memory address within the data memory module, the data memory module provides a predetermined number of data words and the EDC memory module provides a corresponding EDC word, wherein the EDC memory module responds to the same specified memory address as the data memory module.

2. The EDC memory module of claim 1, wherein the EDC memory module provides the corresponding EDC word after the data memory module provides the predetermined number of data words.

3. The EDC memory module of claim 1, wherein the predetermined number of data words is four.

4. The EDC memory module of claim 3, wherein each of the data words is 32 bits in length.

5. The EDC memory module of claim 4, wherein the EDC word is 32 bits in length.

6. The EDC memory module claim 1, wherein the EDC memory module is configured to store EDC words and data words, wherein the EDC words correspond to data words in the data memory module and the EDC memory module.

7. The EDC memory module of claim 1, wherein the EDC memory module is configurable between an EDC memory module and an extended data memory module.

8. The EDC memory module of claim 1, wherein the EDC memory module is configured to store overhead data words.

9. An error detection code (EDC) memory module coupled via a bus to a data memory module, wherein in response to a data word write request, the data memory module stores a predetermined number of data words at a specified address and the EDC memory module stores a corresponding EDC word, wherein the EDC memory module responds to the same specified memory address as the data memory module.

10. The EDC memory module of claim 9, wherein the predetermined number of data words is four.

11. The EDC memory module of claim 10, wherein each of the data words is 32 bits in length.

12. The EDC memory module of claim 11, wherein the EDC word is 32 bits in length.

13. The EDC memory module claim 9, wherein the EDC memory module is configured to store at least one EDC word and data words, wherein the at least one EDC word may correspond to data words in either one of the data memory module and the EDC memory module.

14. The EDC memory module of claim 9, wherein the EDC memory module is configurable between an EDC memory module and an extended data memory module.

15. The EDC memory module of claim 9, wherein the EDC memory module is configured to store overhead data words.

16. A method of performing a read access operation, comprising:
   requesting data words from a specified address within a data memory module;
   providing a predetermined number of data words from the data memory module; and
   providing a corresponding error detection code (EDC) word from an EDC memory module,
   wherein the EDC memory module responds to the same specified memory address as the data memory module.

17. The method of claim 16, wherein the EDC word is provided after the predetermined number of data words is provided.

18. The EDC memory module of claim 16, wherein the predetermined number of data words is four.

19. A method of performing a write access operation, comprising:
   requesting data words to be written to a specified address within a data memory module;
   storing, in response to the request, a predetermined number of data words within the data memory module at the specified address; and
   storing, in response to the request, a corresponding error detection code (EDC) word in an EDC memory module,
   wherein the EDC memory module responds to the same specified memory address as the data memory module.

20. The method of claim 19, wherein the predetermined number of data words is four.

21. A memory system comprising:
   a data memory module;
   an error detection code (EDC) memory module; and a bus coupling the data memory module and the EDC memory module, wherein in response to a request for data from a specified address, the data memory module provides a predetermined number of data words and the EDC memory module provides a corresponding EDC word, and wherein the EDC memory module responds to the same specified memory address as the data memory module.

22. The system of claim 21, wherein the EDC word is provided after the predetermined number of data words is provided.

23. The system of claim 21, wherein the predetermined number of data words is four.

24. The system claim 21, wherein the EDC memory module is configured to store at least one EDC word and data words, wherein the at least one EDC word may correspond to data words in either one of the data memory module and the EDC memory module.

25. The system of claim 21, wherein the EDC memory module is configurable between an EDC memory module and an extended data memory module.

* * * * *